United States Patent [19]
Villanueva et al.

[11] 3,887,063
[45] June 3, 1975

[54] CONVEYOR APPARATUS

[76] Inventors: Juan T. Villanueva; Jesus T. Villanueva, 150 Apo St., Sta Mesa Hgts., both of Quezon City, Philippines

[22] Filed: June 1, 1972

[21] Appl. No.: 258,875

Related U.S. Application Data

[63] Continuation-in-part of Ser. No. 830,449, Jan. 4, 1969, Pat. No. 3,670,366.

[30] Foreign Application Priority Data

June 4, 1968 Philippines .............................. 9282

[52] U.S. Cl. ...................... 198/165; 19/12; 74/234; 226/172
[51] Int. Cl. ............................................ B65g 15/14
[58] Field of Search ................ 198/162, 165; 19/12; 226/172; 74/234

[56] References Cited
UNITED STATES PATENTS
1,656,628   1/1928   Gits ...................................... 74/234
FOREIGN PATENTS OR APPLICATIONS
523,454   4/1921   France ............................... 198/165
731,742   5/1932   France ..................................... 19/12
1,120,772   7/1968   United Kingdom .................. 198/165

*Primary Examiner*—Evon C. Blunk
*Assistant Examiner*—Jeffrey V. Nase
*Attorney, Agent, or Firm*—Michael S. Striker

[57] ABSTRACT

A first conveyor arrangement includes a first elongated endless conveyor having a first run. A second conveyor arrangement includes a second elongated endless conveyor having a second run adjoining the first run and defining together with the first run an elongated path for fibrous material to be transported gripped between the first and second runs. The first conveyor is comprised of a plurality of parallel first elongated endless conveyor sections spaced apart from each other in direction transverse to the elongation of such first sections to define a plurality of elongated parallel first spaces. The second conveyor is comprised of a plurality of parallel second elongated endless conveyor sections spaced apart from each other in direction transverse to the elongation of said second sections to define a plurality of elongated parallel second spaces. Along the first and second runs, said conveyor sections of each conveyor project in direction from the respective one of said runs towards the other one of said runs and into respective ones of the plurality of elongated parallel spaces of the other one of the conveyors.

10 Claims, 13 Drawing Figures

FIG. 3
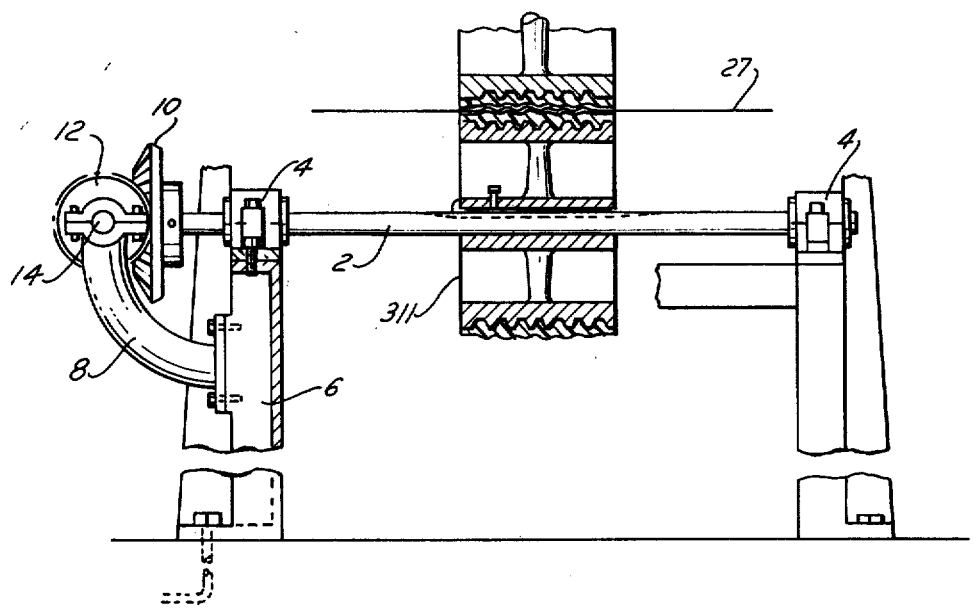
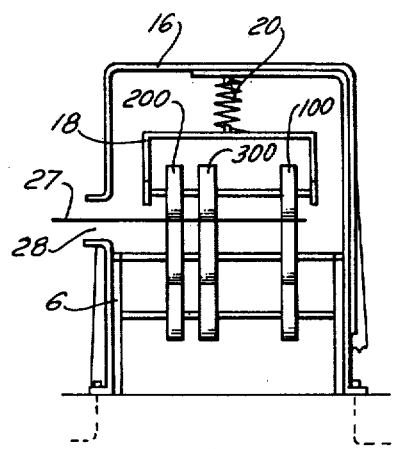
FIG. 4 ns. 3,887,063

CONVEYOR APPARATUS

CROSS-REFFERENCE TO RELATED APPLICATION

The present application is a continuation-in-part of copending application Ser. No. 830,449, filed on Jan. 4, 1969, now issued as U.S. Pat. No. 3,670,366.

BACKGROUND OF THE INVENTION

This invention relates to a conveyor arrangement which for purposes of explanation is illustrated and described as finding use in an apparatus for stripping "leaf sheaths" or "tuxies" as they are more commonly known from the Manila Hemp Plant, also known as Abaca.

While sheaths of fibrous material, such as Abaca, have in former times been stripped by hand by pulling each leaf sheath between stripping elements comprising a blade and a wooden block, an apparatus for automatically stripping sheaths of fibrous material has been disclosed in the above-mentioned U.S. Pat. No. 3,670,366. The aforementioned patent discloses an apparatus for difibering sheaths of fibrous material, particularly Manila hemp, by conveying the sheaths past several stationary blades arranged in the path of travel of the sheaths whereby the edges of the blades separate the fibrous parts of the sheaths from the pulpy parts. However, in operation of this apparatus certain difficulties did arise in that the sheaths to be defibered did slip with regard to the transporting means used for transporting the sheaths past the stationary blades.

SUMMARY OF THE INVENTION

It is an object of the present invention to provide a conveying arrangement which can be used in an apparatus for automatically defibering sheaths of fibrous material, which avoids the difficulties encountered with apparatuses of this type.

It is a further object of the present invention to provide improved conveying means which will positively grip the sheaths to be defibered so that slippage of these sheaths with regard to the conveying means may be avoided.

It is an additional object of the present invention to provide an apparatus of the aforementioned kind which is composed of relatively few and rugged parts, so that the apparatus may be built at reasonable cost and function perfectly even after extended use.

With these and other objects in view, which will become apparent as the description proceeds, the conveyor for use in an apparatus for defibering sheaths of fibrous material, particularly sheaths of Abaca, mainly comprises an upper and a lower endless conveyor having adjacent runs for positively engaging opposite surface portions of the sheaths therebetween for transporting successive sheaths sideways along a predetermined path. The upper endless conveyor of the conveyor means comprises a plurality of pulleys each formed withh a plurality of circumferential grooves and being mounted spaced from each other in the direction of the aforementioned path for rotation about parallel axes substantially normal to the path and an endless flexible means located in the grooves of said pulleys. The lower endless conveyor of the conveyor means comprises along its upper run a plurality of pulleys each formed with a plurality of circumferential grooves which are offset in the direction normal to the path with respect to the grooves in the pulley of the upper conveyor. The pulleys of the lower conveyor are mounted for rotation about parallel axes substantially normal to said path, which axes are spaced from each other in the direction of the path but offset in this direction with respect to the axes of the pulleys of the upper conveyor coordinated therewith, and endless flexible means located in the grooves of the pulleys in the lower conveyor. The apparatus comprises further drive means for driving at least one pulley of each conveyor.

The apparatus preferably further includes first stationary support means mounting the pulleys of the lower endless conveyor means for rotation about their axes, second support means movable substantially in vertical direction toward and away from the stationary support means and mounting the pulleys of the upper endless conveyor of each conveyor means for rotation about their axes and biasing means biasing said movable support means toward the stationary support means.

The aforementioned grooves in the pulleys may have a cross-section forming part of a circle and the grooves may be separated by ridges each having a cross-section of a convex circular sector. In this case the endless flexible means located in the grooves may have circular cross sections and may be constituted by ropes.

On the other hand, and preferably, each of the grooves in the pulleys may have a trapezoidal cross-section in which case the endless flexible means comprises an endless band having a plurality of longitudinally extending transversely spaced ridges of corresponding trapezoidal cross-section projecting from one face of the band and being respectively located in the groove, whereas the other face of the band has an undulated surface which will engage the sheaths of fibrous material to be transported.

The undulations of the band of the upper conveyor of each conveyor means are preferably transversely offset with respect to the undulations of the band of the lower conveyor of the respective conveyor means.

The band is preferably formed from rubber, and it preferably includes also reinforcements embedded in the rubber.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a partial cross-section taken along the line III—III of FIG. 1 and drawn to an enlarged scale;

FIG. 4 is a schematic cross-section taken along the line IV—IV of FIG. 1;

FIGS. 5A–7B are presented to show each of the third conveyor means separately so that the arrangement of each of the conveyor means may be clearly ascertained whereby for clarity's sake the upper conveyor of each conveyor means is shown spaced upwardly from the lower conveyor thereof;

DESCRIPTION OF THE PREFERRED EMBODIMENTS

For purpose of explanation, several conveyor arrangements according to the present invention are shown employed in machine for defibering fibrous material, particularly Abaca.

Figure 1:
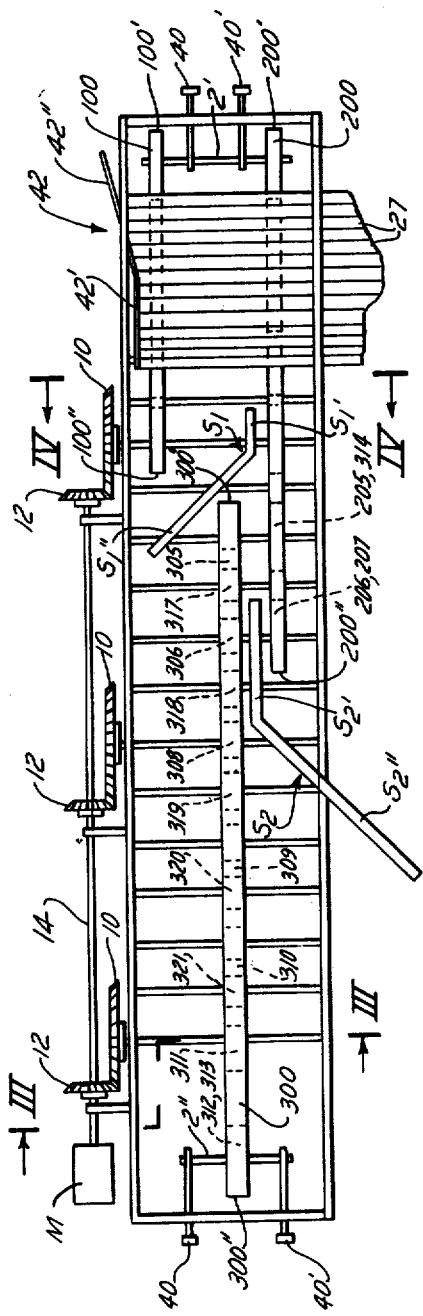
FIG. 1 is a schematic top view of the conveyor apparatus according to the present invention employed in a defibering machine.
Figure 2:
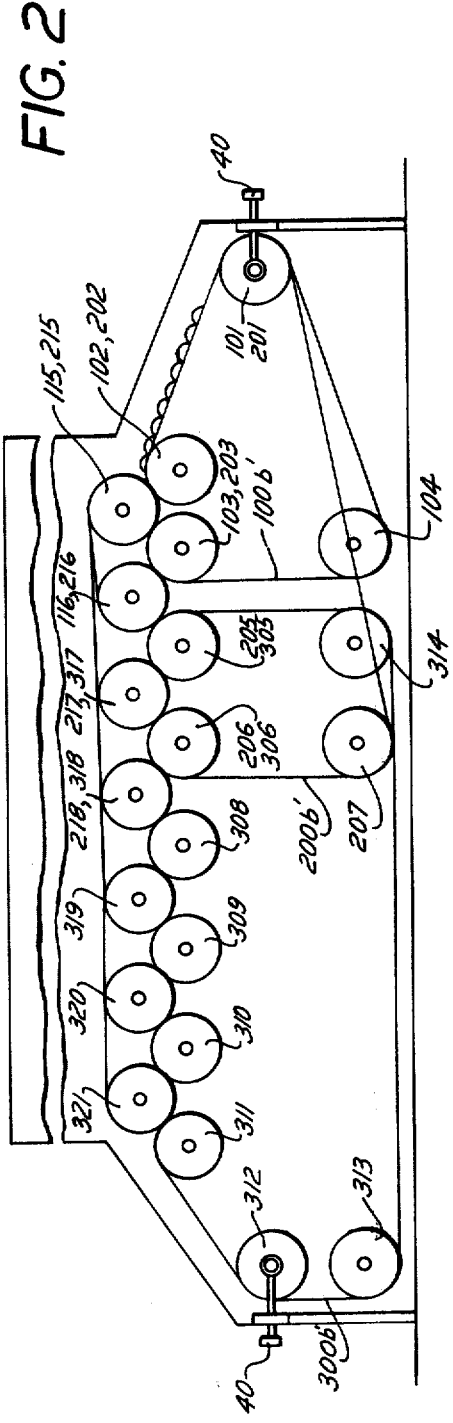
FIG. 2 is a schematic side view of the apparatus.

Referring now to the drawing and more specifically to FIGS. 1 and 2 of the same, it will be seen that the defibering apparatus may comprise a plurality of conveyor means for transporting sheaths of fibrous material 27, for instance Abaca, sideways along a rectilinear path extending in the direction of the conveyor means. The conveyor means comprise a first conveyor means 100, a second conveyor means 200 extending parallel and transversely spaced from the first conveyor means. The conveyor means 100 has a leading end 100' which is preferably aligned with the leading end 200' in direction transverse to the longitudinal direction of the two conveyor means, whereas the trailing end 200" of the second conveyor means is located downstream, and spaced a considerable distance from the trailing end 100" of the first conveyor means. A third conveyor means 300 extends parallel and inwardly spaced from the first and the second conveyor means and this third conveyor means has a leading end 300' spaced transversely from and downstream of the trailing end 100' of the first conveyor means to define between the trailing end 100" of the first conveyor means and the leading end 300' of the third conveyor means a gap. As further seen in FIG. 1, the trailing end 300" of the third conveyor means is located downstream and spaced a considerable distance from the trailing end 200" of the second conveyor means, because of the lengths of the abaca tuxies or leaf sheaths and the fibers derived therefrom. The apparatus includes further two stationary stripping means $S_1$ and $S_2$ each of which includes an upright stripping blade having an upper edge, and the stripping means $S_1$ has a first short round-edged portion $S_1'$ extending between and parallel to the first and second conveyor means 100 and 200 and closer to the conveyor means 200 than to the conveyor means 100, and a second portion $S_1''$ with the well defined sharp corners of its square shaped dull edge extending at an obtuse angle from the portion $S_1'$ through the aforementioned gap slightly beyond the first conveyor means 100. The second stripping means $S_2$ likewise comprises a first round-edged portion $S_2'$ extending parallel to and between the second and third conveyor means 200 and 300, whereas a second portion $S_2''$ of the second stripping means with the well defined sharp cornners of its square shaped dull edge extends at an obtuse angle. to the first portion away from the third conveyor means 300, downstream and adjacent to the trailing end 200" of the second conveyor means 200, and laterally beyond the latter. The specific construction of the stripping means $S_1$ and $S_2$ does not form part of the present invention and this construction is clearly disclosed in the aforementioned U.S. patent. As described therein, each of the stripping means may also comprise a wooden block for pressing the sheaths while being transported by the transporting means against the upper stripping edge of the blades of the stripping means.

Each of the conveyor means 100–300 comprise an upper conveyor and a lower conveyor cooperating therewith to grip the sheaths of fibrous material between the lower run of the upper conveyor and the upper run of the lower conveyor. While the upper and lower conveyors of the three conveyor means are shown in FIG. 2 in their position relative to each other, 5A–7B respectively show only the first, the second or the third conveyor in full lines while indicating respectively the other conveyors in dotted lines, so that the arrangement of each of these conveyors may be better visualized.

Figure 5A:
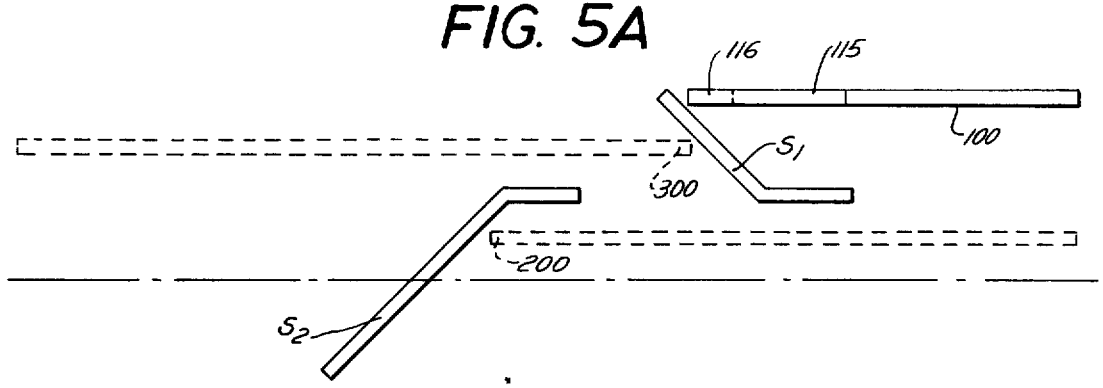
FIGS. 5A and 5B respectively show the first conveyor in top view and side view in full lines and its relation to the stripping blade.
Figure 5B:
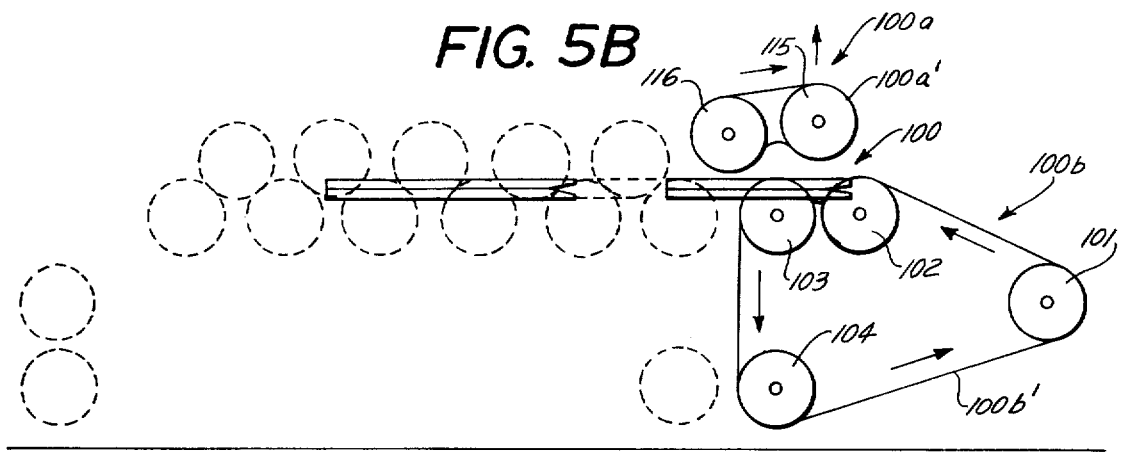

Referring now to the FIGS. 5A and 5B it will be seen that the first conveyor means 100 comprises an upper conveyor 100a, and a lower conveyor 100b. The upper conveyor 100a comprises two pulleys 115 and 116 rotatable about parallel axes extending normal to the longitudinal direction of the conveyor and an endless flexible means 100a' which will be described in detail later on, extending about the periphery of the two pulleys 115 and 116. The lower conveyor or 110b of the first conveyor means 100 comprises two pulleys 102 and 103 respectively cooperating with the pulleys 115 and 116 of the upper conveyor 100a in a manner as will be described later on and two additional pulleys 101 and 104 arranged downwardly of the pulleys 102 and 103 with the pulley 101 arranged also upstream of the pulley 102. An endless flexible means 100b' extends around the pulleys 101–104 as shown in FIG. 5B. As likewise shown in this Figure the axes of the pulleys 102 and 103 are offset with respect to the axes of the pulleys 115 and 116, in longitudinal direction of the conveyor and while in FIG. 5B the upper conveyor 100a is for clarity's sake shown upwardly spaced from the lower conveyor 100b, in actuality the pulleys 115 and 116 of the upper conveyor 100a are arranged with regard to the pulleys 102, 103 of the lower conveyor 100b as shown in FIG. 2, so that the vertical distance of the axes of the pulleys 115 and 116, from the cooperating pulleys 102 and 103 of the lower conveyor 100b is smaller than the diameter of the pulleys and so that the endless flexible means 100a' of the upper conveyor flexes upwardly between the pulleys 115 and 116, while the endless flexible means 100b' of the lower conveyor flexes downwardly between the pulleys 102 and 103, as indicated in FIG. 5B, while gripping the sheaths 27 located therebetween.

Figure 6A:
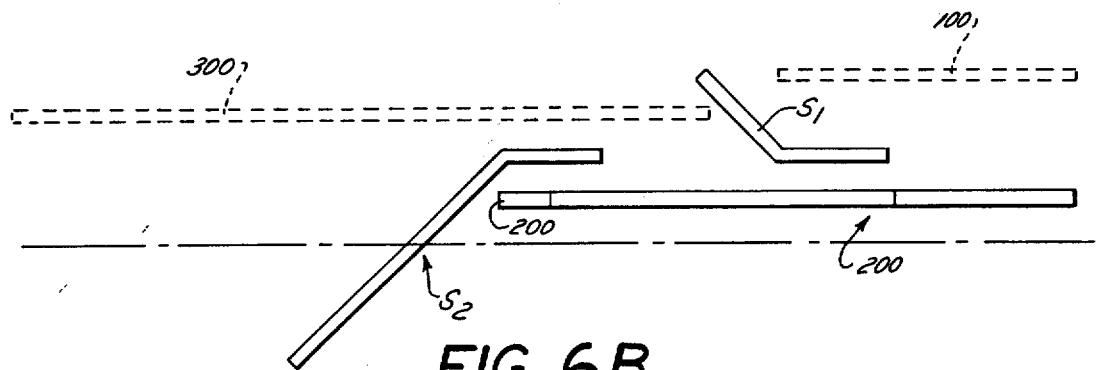
FIGS. 6A and 6B respectively show a top view and a side view of the second conveyor.
Figure 6B:
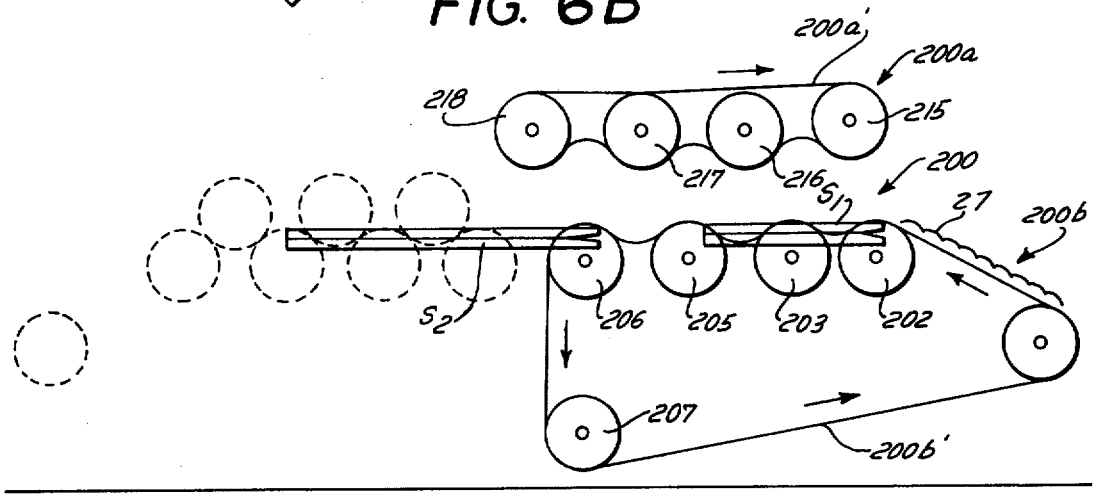

Referring now to FIGS. 6A and 6B in which the second conveyor means 200 and the two stripping means S₁ and S₂ are shown in full lines, whereas the first conveyor means 100 and the third conveyor 300 are only indicated in dotted lines, it will be seen that the second conveyor means 200 likewise comprises an upper conveyor 200a and a lower conveyor 200b. The upper conveyor 200a comprises four pulleys 215, 216, 217 and 218, the axes of which are located in a horizontal plane and spaced from each other in the longitudinal direction of the conveyor means 200 and an endless flexible means 200a' extends about the pulleys 215 and 218 and engages also circumferential portions of the pulleys 216 and 217. The lower conveyor 200b comprises six pulleys 201–207, in which the axes of the pulleys 202 to 206 are located spaced in the longitudinal direction of the conveyor means from each other in a horizontal plane and respectively offset in the longitudinal direction of the conveyor means with regard to the axes of the pulleys 215–218. The axis of the pulley 210 is located upstream of the axis of the pulley 202 and at an elevation lower than the axis of the latter, whereas the axis of the pulley 207 is preferably located downwardly spaced from axis of the pulley 206. An endless flexible means 200b', of a nature as will be described later on, extends about the pulleys 201–207. In FIG. 6b the upper conveyor 200a is for clarity's sake again shown upwardly spaced from the lower conveyor 200b, but these conveyors are in actuality arranged with respect to each other as shown in FIG. 2, so that the endless flexible means 200a' of the upper conveyor curves upwardly between each of the adjacent pulleys of the upper conveyor whereas the endless flexible means 200b' curves downwardly between the adjacent pulleys 202–206, as shown in FIG. 6.

Figure 7A:
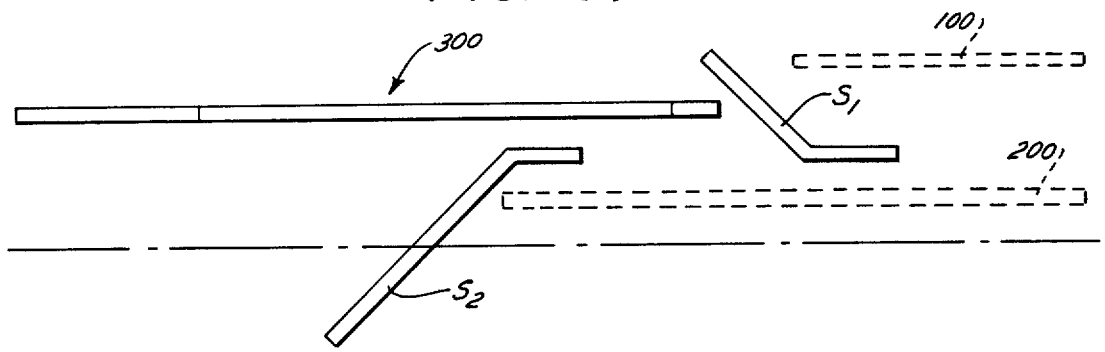
FIGS. 7A and 7B respectively show a top view and side view of the third conveyor.
Figure 7B:
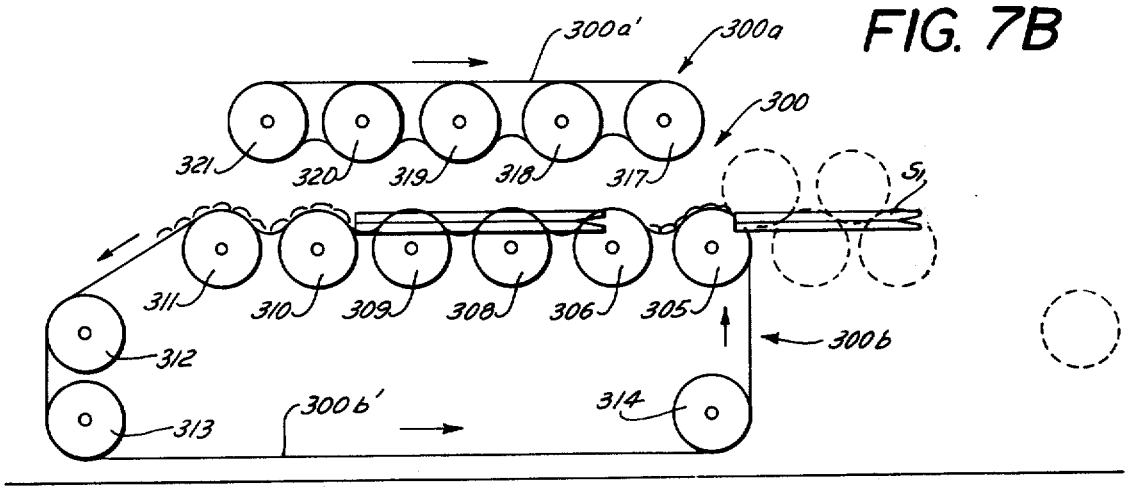

The third conveyor 300 is best shown in FIGS. 7A-7B. As shown in FIG. 7B the upper conveyor 300a comprises five pulleys 317–321, the axes of which are located spaced in the longitudinal direction of the conveyor from each other in a horizontal plane and an endless flexible means 300a' wound about these pulleys as shown in FIG. 7B. The lower conveyor 300b comprises the pulleys 305–314 in which the axes of the pulleys 305–311 are located in a horizontal plane, spaced from each other in the longitudinal direction of the conveyor and offset in this direction with regard to the axes of the pulleys 317–321 of the upper conveyor 300a. An endless flexible means 300b' is wound about the pulleys of the lower conveyor 300b, and again the upper conveyor is shown in FIG. 7B spaced from the lower conveyor, whereas in operation the pulleys of the upper and lower conveyor are arranged with respect to each other as shown in FIG. 2, so that the endless flexible means 300a' of the upper conveyor curves upwardly between adjacent pulleys and the endless flexible means 300b' of the lower conveyor curves downwardly between the adjacent pulleys 305–311, as indicated in FIG. 7B.

The pulleys of all lower conveyors are mounted on shafts 2 for turning therewith, as shown in the FIG. 3 for the pulley 311, and the shafts 2 are turnably mounted in bearings 4 supported by a stationary frame 6. At least one pulley of each lower conveyor is driven, and as shown in FIGS. 1 and 2, the pulley 103 of the lower conveyor 100b and the pulley 203 of the lower conveyor 200b are mounted on a common shaft, to the outer end of which, extending beyond the frame 6, a bevel gear 10 is fixed with meshes with a bevel pinion 12 fixedly mounted on a shaft 14, which in turn is driven from a motor M. The shaft 14 is turnably supported on a plurality of bearings mounted on brackets 8 extending laterally from the frame 6 and fixed thereby by screws or the like as best shown in FIG. 3. Preferably, two of the pulleys of the third conveyor 300a are driven, and as shown in FIG. 1, the shafts of the pulleys 308 and 311 are likewise provided at the outer ends thereof with bevel gears 10 fixed thereto which mesh with corresponding bevel pinions 12 on the driven shaft 14.

While the pulleys of all lower conveyors are mounted on the stationary frame 6 anchored to the foundation of the apparatus as indicated in FIG. 3, the pulleys of all upper conveyors are mounted for movement towards and away from the pulleys of the lower conveyors as schematically illustrated in FIG. 4. For this purpose a substantially U-shaped outer frame 16 is connected at one side thereof to the lower frame 6, extending upwardly therefrom, and an inner U-shaped frame 18 supports the shafts of the pulleys of the upper conveyors turnably in bearings respectively mounted on the ends of the legs of the inner U-shaped frame 18. A plurality of springs 20, only one of which is shown in FIG. 4, sandwiched between the outer frame 16 and the inner frame 18, as shown in FIG. 4, presses the inner frame 18 and the pulleys on all upper conveyors downwardly towards the pulleys of all lower conveyors. The outer frame 16 provides on one side thereof an elongated slot 28 through which ends of the fibrous sheaths 27 transported by the conveyors, may extend, as indicated in FIG. 4. Instead of a single inner frame 18, a plurality of such frames may be provided so that the pulleys carried thereby may adjust their position relative to each other.

As shown in FIGS. 1 and 2, the pulleys 101 and 201 are mounted on a common shaft 2' the outer ends of which are not mounted in bearings on the frame 6 but in a pair of tensionind means 40 adjustably mounted in a known manner, not shown in the drawing, in transverse portions of the frame 6 so that the pulleys 101 and 201 may be moved in horizontal direction to tighten the endless flexible means of the lower conveyors 100b and 200b. The pulley 312 of the third conveyor means 300 is mounted in the same manner for tightening the endless flexible means extending about the lower conveyor 300b. The apparatus includes further a guide 42, as shown in FIG. 1, which is mounted in stationary position adjacent the conveyor 100 and the guide 42 has a portion 42' substantially parallel to the conveyor 100 and an upstream lead-in portion 42" which extends outwardly at an angle from the leading end of the portion 42'. The guide 42 is arranged for engaging the ends of the sheaths as they are transported by the lower conveyors 100b and 200b to thus align the engaged ends in the direction of the path at which the sheaths are transported.

The endless flexible means 100a', 100b', 200a', 200b', 300a' and 300b' respectively wound about the pulleys of the upper and lower conveyors of the conveyor means 100, 200 and 300 may be constituted by ropes or by rubber belts provided with ridges and the rims of the pulleys are provided at the peripheral surfaces thereof with grooves in which the ropes or the ridges of the rubber belts are frictionally engaged.

Figure 8:
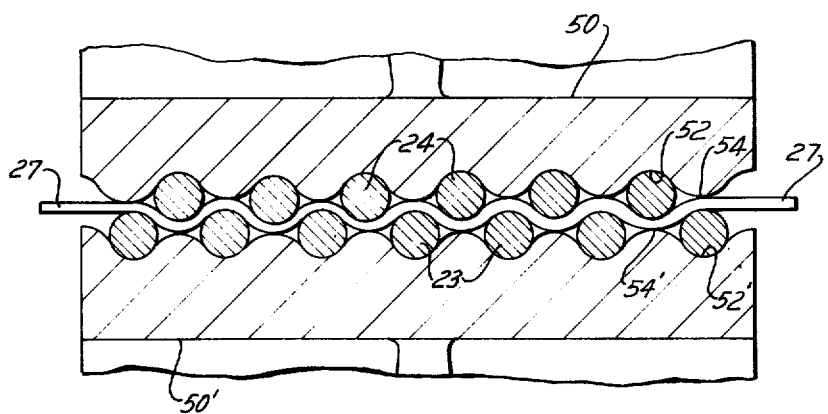
FIG. 8 is a partial cross-section through cooperating pulleys of the upper and lower conveyor of each conveyor means in which the endless flexible means located in the pulleys are formed by ropes.

FIG. 8 illustrates an arrangement in which the endless flexible means mentioned before are constituted by endless ropes wound about the pulleys as described in connection with FIGS. 5A-7B. The rims 50 of the pulleys of all upper conveyors 100a, 200a, and 300a, are formed at the outer peripheral surface thereof with a plurality of grooves 52 of part-circular cross-section which are transversely spaced from each other and separated by convexly curved ridges 54. The rims of the pulleys 50' of the lower conveyors 100b, 200b, and 300b, are formed on the peripheral surface thereof likewise with grooves 52' of the same cross section as the grooves 52 and likewise separated by convexly curved ridges 54' but, as shown in FIG. 8, the grooves 52' are transversely offset with regard to the grooves 52 so that a ridge 54 on the rim of each pulley of each upper conveyor is located opposite a groove 52' in the rim of the pulley of each lower conveyor. The aforementioned endless flexible means are in this case constituted by a plurality of endless ropes 23 and 24 respectively located in the grooves 52' and 52.

When the pulleys of the upper and lower conveyors are in the operative positions thereof as shown in FIG. 8 the sheaths 27 fed between the ropes 23 and 24 will be deformed to the wavy configuration as shown in FIG. 8 so that they will be tightly gripped between the facing portions of the ropes. The grocves 52 and 52' and the ridges 54 and 54' therebetween should be configurated in relation to the diameter of the ropes 23 and 24 so that the ropes, even in the absence of any fibrous material therebetween, will not engage each other but so that the ropes 23 will engage the ridges 54 while the ropes 24 will engage the ridges 54'.

Figure 9:
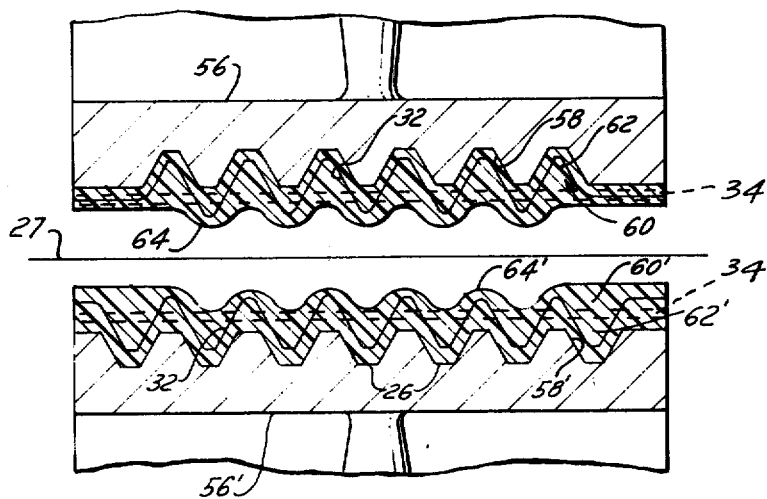
FIG. 9 is a partial axial cross-section through a modified pulley construction with modified endless conveyor means located in the grooves thereof, the two pulleys being shown spaced from each other.
Figure 10:
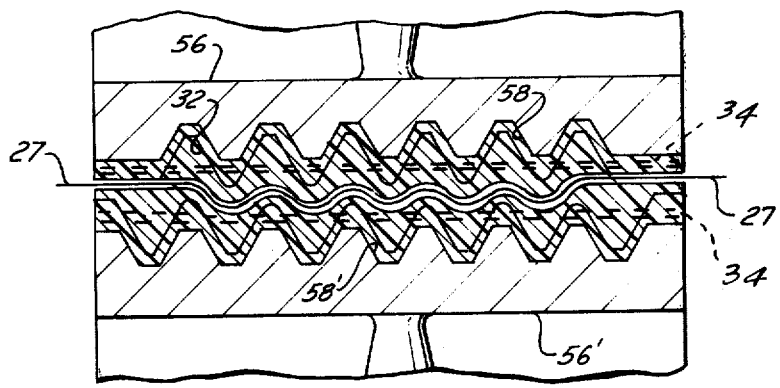
FIG. 10 is a partial cross-section corresponding to FIG. 9 in which the upper pulley is moved toward the lower pulley so that the endless flexible means located in the grooves of the pulleys will engage sheaths of fibrous material to convey the latter.

FIGS. 9 and 10 illustrate an arrangement in which the aforementioned endless flexible means are formed by rubber belts. In this arrangement, the rims 56 of all pulleys of all upper conveyors 100a, 200a, and 300a are provided on the outer peripheral surface thereof with a plurality of grooves 58 of trapezoidal cross section which are transversely spaced from each other and the rims 56' of the pulleys of the lower conveyors 100b, 200b, and 300b are formed with corresponding grooves 58' of the same cross section as the grooves 58, but, as clearly shown in FIGS. 9 and 10, the grooves 58' are offset in transverse direction with regard to the grooves 58 so that each groove 58'0 faces a ridge between corresponding grooves 58. The endless flexible means in this case are constituted by rubber belts respectively designated with the reference numerals 60 and 60', and each of the rubber belts has a plurality of longitudinally extending transversely spaced ridges 62, respectively 62', of trapezoidal cross section substantially identical to the cross section of the grooves 58 and 58' and respectively located in these grooves. Since the grooves 58 and 58' are offset in transverse direction, the corresponding ridges 62 and 62' on the rubber belts 60 and 60' have also to be correspondingly offset in transverse direction as clearly shown in FIGS. 9 and 10. The surfaces of the two belts 60 and 60' which are opposite to the surfaces from which the ridges 62 and 62' project have an undulated configuration so as to provide a plurality of convexly curved ridges 64, respectively 64', separated by concavely curved grooves, and as clearly evident from FIGS. 9 and 10, the convexly curved ridges 64' on the rubber belt 60' are transversely offset with regard to the ridges 64 on the rubber belt 60. In FIG. 9 the two belts are shown considerably spaced from each other, whereas FIG. 10 shows the belts in operative position, and as evident from this Figure the sheaths 27 transported by the belts will be deformed into a wavy configuration, as shown in FIG. 10, so that these sheaths 27 will be tightly gripped by the two rubber belts. The rubber belts are preferably reinforced and such reinforcement may include for each belt a transverse web 34 and a zig-zag web 32 embedded in the material of the respective rubber belt.

While the arrangement shown in FIG. 8 is simpler in construction than the arrangement as shown in FIGS. 9 and 10, the latter arrangement provides not only a better frictional engagement between the pulleys and the rubber belts but a scheme more in line with modern trends of machine design conducive to lower cost of manufacture and greater simplicity of maintenance.

The above described apparatus will operate as follows:

The sheaths of fibrous material, for instance sheaths of Abaca, are fed by hand or by an additional conveyor, not shown in the drawing, sidewise one after the other onto the portions of the endless flexible means 100b' and 200b' respectively extending between the pulleys 101 and 102 and 210 and 202, so as to e fed between the lower runs of the upper conveyors 100a and 200a, and the upper runs of the lower conveyors 100b and 200b while the upper ends of the sheaths, as viewed in FIG. 1, are aligned with each other by the guide means 42. The sheaths are then tightly gripped and transported towards the first stripping means $S_1$. During the first part of the movement of the sheaths over the stripping means $S_1$, the sheaths are gripped at transversely spaced portions thereof by the conveyor means 100 and 200, and as soon as the sheaths reach the trailing end 100" of the first conveyor they are gripped at portions thereof by the third conveyor 300 so that they are still gripped at transversely spaced portions by the conveyor mean 200 and 300 at the beginning of their passage over the second stripping means $S_2$. Only after the sheaths reach the trailing end 200" of the second conveyor means they are only gripped between the lower run of the upper conveyor 300a and the upper run of the lower conveyor 300b which pull the thus gripped sheaths over the outwardly extending portion $S_2''$ of the second stripping means. As mentioned before, each of the stripping means comprises a blade having an upper stripping edge against which the sheaths are pressed by a wooden block or the like so that the pulpy material is squeezed out together with the sap of the sheaths while they are transported sidewise by the conveyor means.

It will be understood that each of the elements described above, or two or more together, may also find a useful application in other types of apparatus for defibering sheaths of fibrous material differing from the types described above.

While the invention has been illustrated and described as embodied in a novel apparatus for defibering sheaths of fibrous material in which the sheaths are transported sidewise by conveyor means over stripping blades, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A conveyor arrangement, comprising, in combination, a first endless conveyor arrangement comprising first elongated endless conveyor means having a first run; and a second endless conveyor arrangement comprising second elongated endless conveyor means having a second run adjoining said first run, the facing surfaces of said first and second runs defining together an elongated path for fibrous material to be transported gripped between said first and second runs oriented in direction transverse to the elongation of said first and second runs, said surface of said first run having a first undulating transverse cross-sectional configuration, and said first elongated endless conveyor means being comprised of a plurality of parallel endless flexible first elongated conveyor sections spaced apart from each other in direction transverse to the elongation of said first sections to define a plurality of elongated parallel first spaces and to impart to said surface of said first run said first undulating transverse cross-sectional configuration, and said surface of said second run having a second undulating transverse cross-section configuration exactly complementary to said first undulating transverse cross-sectional configuration, and said second elongated endless conveyor means being comprised of a plurality of parallel endless flexible second elongated conveyor sections spaced apart from each other in direction transverse to the elongation of said second sections to define a plurality of elongated parallel second spaced and to impart to said surface of said second run said second undulating transverse cross-sectional configuration, and wherein along said first and second runs said sections of each conveyor means project in direction from the respective one of said runs towards the other one of said runs and into respective ones of the plurality of elongated parallel spaces of the other one of said conveyor means, with said surfaces of said first and second runs mating uniformly in transverse direction due to the exactly complementary undulating transverse cross-sectional configurations of said surfaces of said first and second runs.

2. An arrangement as defined in claim 1, wherein said first and second elongated endless conveyor means are respectively comprised of a first and of a second elongated endless conveyor belt each having a plurality of parallel spaced longitudinally extending ridges respectively constituting said endless first and said second elongated conveyor sections.

3. An arrangement as defined in claim 2, wherein said first conveyor arrangement comprises a plurality of parallel first guide rollers, said first conveyor belt being trained around said first guide rollers, and wherein said second conveyor arrangement comprises a plurality of parallel second guide rollers, said second conveyor belt being trained around said second guide rollers.

4. An arrangement as defined in claim 3, wherein along said first and second runs said first guide rollers are staggered relative to said second guide rollers, and wherein along said first and second runs said first guide rollers project in direction from said first run towards said second run into the spaces between adjoining ones of said second guide rollers.

5. An arrangement as defined in claim 3, wherein said first and second conveyor belts each have outer faces respectively provided with said plurality of parallel spaced longitudinally extending ridges and an inner face which along said runs contact the surfaces of the guide rollers of the respective plurality of guide rollers, and wherein said inner face of each of said belts is provided with a respective plurality of additional parallel spaced longitudinally extending ridges, and wherein said guide rollers are provided with axially spaced parallel annular guide grooves receiving and guiding respective ones of said additional ridges.

6. An arrangement as defined in claim 5, wherein along said first and second runs said first guide rollers are staggered relative to said second guide rollers, and wherein along said first and second runs said first guide rollers project in direction from said first run towards said second run into the spaces between adjoining ones of said second guide rollers.

7. An arrangement as defined in claim 5, wherein the longitudinally extending ridges on the outer face of each of said conveyor belts are staggered relative to the longitudinally extending ridges on the inner face thereof.

8. An arrangement as defined in claim 7, wherein along said first and second runs said first guide rollers are staggered relative to said second guide rollers, and wherein along said first and second runs said first guide rollers project in direction from said first run towards said second run into the spaces between adjoining ones of said second guide rollers.

9. An arrangement as defined in claim 7, wherein the ridges on the inner face of each of the conveyor belts are or trapezoidal cross-section.

10. An arrangement as defined in claim 9, wherein along said first and second runs said first guide rollers are staggered relative to said second guide rollers, and wherein along said first and second runs said first guide rollers project in direction from said first run towards said second run into the spaces between adjoining ones of said second guide rollers.

* * * * *